(12) United States Patent
Muff et al.

(10) Patent No.: US 8,984,260 B2
(45) Date of Patent: Mar. 17, 2015

(54) PREDECODE LOGIC AUTOVECTORIZING A GROUP OF SCALAR INSTRUCTIONS INCLUDING RESULT SUMMING ADD INSTRUCTION TO A VECTOR INSTRUCTION FOR EXECUTION IN VECTOR UNIT WITH DOT PRODUCT ADDER

(75) Inventors: Adam J. Muff, Rochester, MN (US);
Paul E. Schardt, Rochester, MN (US);
Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 13/330,888

(22) Filed: Dec. 20, 2011

(65) Prior Publication Data
US 2013/0159668 A1 Jun. 20, 2013

(51) Int. Cl.
| G06F 9/302 | (2006.01) |
| G06F 17/16 | (2006.01) |
| G06F 9/30 | (2006.01) |
| G06F 9/455 | (2006.01) |

(52) U.S. Cl.
CPC ........ *G06F 9/30036* (2013.01); *G06F 9/45516* (2013.01); *G06F 9/30145* (2013.01)
USPC ........... 712/222; 712/7; 712/213; 712/E9.028

(58) Field of Classification Search
None
See application file for complete search history.

(56) References Cited

U.S. PATENT DOCUMENTS

| 5,537,606 | A | 7/1996 | Byrne |
| 6,788,303 | B2 | 9/2004 | Baldwin |
| 7,594,102 | B2 | 9/2009 | Colavin et al. |
| 2004/0193838 | A1* | 9/2004 | Devaney et al. ................... 712/3 |
| 2008/0229066 | A1 | 9/2008 | Gschwind |
| 2009/0313458 | A1 | 12/2009 | Colavin et al. |
| 2013/0067196 | A1* | 3/2013 | Michalak et al. ................ 712/7 |

\* cited by examiner

*Primary Examiner* — Kenneth Kim
(74) *Attorney, Agent, or Firm* — Wood, Herron & Evans, LLP

(57) ABSTRACT

A circuit arrangement, method, and program product for substituting a plurality of scalar instructions in an instruction stream with a functionally equivalent vector instruction for execution by a vector execution unit. Predecode logic is coupled to an instruction buffer which stores instructions in an instruction stream to be executed by the vector execution unit. The predecode logic analyzes the instructions passing through the instruction buffer to identify a plurality of scalar instructions that may be replaced by a vector instruction in the instruction stream. The predecode logic may generate the functionally equivalent vector instruction based on the plurality of scalar instructions, and the functionally equivalent vector instruction may be substituted into the instruction stream, such that the vector execution unit executes the vector instruction in lieu of the plurality of scalar instructions.

21 Claims, 7 Drawing Sheets

PREDECODE LOGIC AUTOVECTORIZING A GROUP OF SCALAR INSTRUCTIONS INCLUDING RESULT SUMMING ADD INSTRUCTION TO A VECTOR INSTRUCTION FOR EXECUTION IN VECTOR UNIT WITH DOT PRODUCT ADDER

FIELD OF THE INVENTION

The invention is generally related to data processing, and in particular to processor architectures and execution units incorporated therein.

BACKGROUND OF THE INVENTION

Modern computer processor architectures typically rely on multiple functional units to execute instructions from a computer program. An instruction or issue unit typically retrieves instructions and dispatches, or issues, the instructions to one or more execution units to handle the instructions. A typical computer processor may include, for example, a load/store unit that handles retrieval and storage of data from and to a memory, and a fixed point execution unit, or arithmetic logic unit (ALU), to handle logical and arithmetic operations.

Conventional computer processor architectures typically included scalar execution units that execute scalar instructions on scalar values stored in a register file accessible by the execution unit. Due to hardware advances that now permit multiple and more complex execution units to reside in the same processor, however, computer processor architectures increasingly rely on vector execution units to perform some operations. Vector execution units, which are also sometimes referred to as single instruction multiple data (SIMD) execution units, operate on vector values comprising multiple scalar values using multiple processing lanes to effectively perform parallel operations on the multiple scalar values. In addition, some vector execution units are optimized to handle floating point operations, thereby enabling multiple floating point operations to be performed in parallel. The vector data is typically stored in a vector register file accessible by the vector execution unit. Since vector execution units typically perform more operations per clock cycle, for certain types of operations, executing vector instructions is preferable to executing scalar instructions. In many graphical processing applications, for example, numerous mathematical operations need to be performed on coordinates in a three-dimensional space, and by storing x, y and z coordinates in a vector, such mathematical operations can be performed on all of the coordinate values in parallel using a vector execution unit, rather than requiring three separate scalar operations for the three coordinate values.

However, legacy software, for many iterations of computer hardware architecture may not be written to utilize vector execution units and vector instructions, hence leaving many processes to execute scalar instructions in what is generally a less efficient manner. One solution to this issue involves rewriting and recompiling software written for computer hardware architectures not utilizing vector instructions to generate software that includes vector instructions. However, rewriting and recompiling such software can be troublesome and expensive. A second solution to the issue executes scalar instructions using only one processing lane of a vector execution unit, thereby effectively utilizing a vector execution unit as a scalar execution unit. However, this approach generally reduces the efficiency associated with using a vector execution unit, since the other processing lanes are essentially dormant during these operations.

Therefore, a continuing need exists in the art for a manner of increasing the efficiency of instruction execution in computing systems including vector execution units.

SUMMARY OF THE INVENTION

The invention addresses these and other problems associated with the prior art by converting a plurality of scalar instructions in an instruction stream to a functionally equivalent vector instruction and replacing the plurality of scalar instructions with the vector instruction. As instructions in an instruction stream are loaded into an instruction buffer in a processor or processing core, predecode logic coupled to the instruction buffer analyzes the instructions to identify a plurality of scalar instructions in the instruction stream that may be converted to a functionally equivalent vector instruction. The predecode logic generates the functionally equivalent vector instruction based on the plurality of scalar instructions and substitutes the vector instruction into the instruction stream for the plurality of scalar instructions prior to decoding the plurality of instructions using decode logic coupled to a vector execution unit. As such, in some embodiments consistent with the invention, the functionally equivalent vector instruction is communicated to the decode logic at the appropriate location in the instruction stream in lieu of the plurality of scalar instructions.

As such, in some embodiments of the invention, replacing a plurality of scalar instructions with a functionally equivalent vector instruction may be performed substantially on-the-fly and during processing/execution of an instruction stream, such that executing instructions in the instruction stream is not delayed while analyzing the instruction stream. Utilizing predecode logic consistent with some embodiments of the invention, coupled to an instruction buffer which stores instructions in an instruction stream that have not been decoded and/or executed, a plurality of scalar instructions may be replaced with a functionally equivalent vector instruction in the instruction stream during processing and execution of the instruction stream. Therefore in embodiments consistent with the invention, an instruction stream including less efficient scalar instructions may be optimized for execution in a vector execution unit.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments of the invention detect scalar instructions in an instruction stream being executed by a vector execution unit and generate a functionally equivalent vector instruction based on a plurality of the scalar instructions, such that the scalar instructions may be executed in parallel utilizing a plurality of processing lanes of the vector execution unit. Predecode logic may be coupled to an instruction buffer which stores instructions in the instruction stream at a location in the execution path prior to decode logic may analyze instructions passing through the buffer to identify a plurality of scalar instructions that may be combined into a functionally equivalent vector instruction. The predecode logic may generate the functionally equivalent vector instruction based on the scalar instructions and other characteristics of the processor and/or vector execution unit of the processor, including for example, the number of processing lanes of the vector execution unit, the number of read and/or write ports configured between the vector execution unit and a register file addressed by the scalar instructions, and/or the types of operations indicated by the scalar instructions. The predecode logic substitutes the functionally equivalent vector instruction at the proper location in the instruction stream prior to the plurality of scalar instructions being decoded for execution, such that the functionally equivalent vector instruction is decoded and/or executed by the vector instruction unit in lieu of the plurality of scalar instructions.

Hardware and Software Environment

Figure 1:
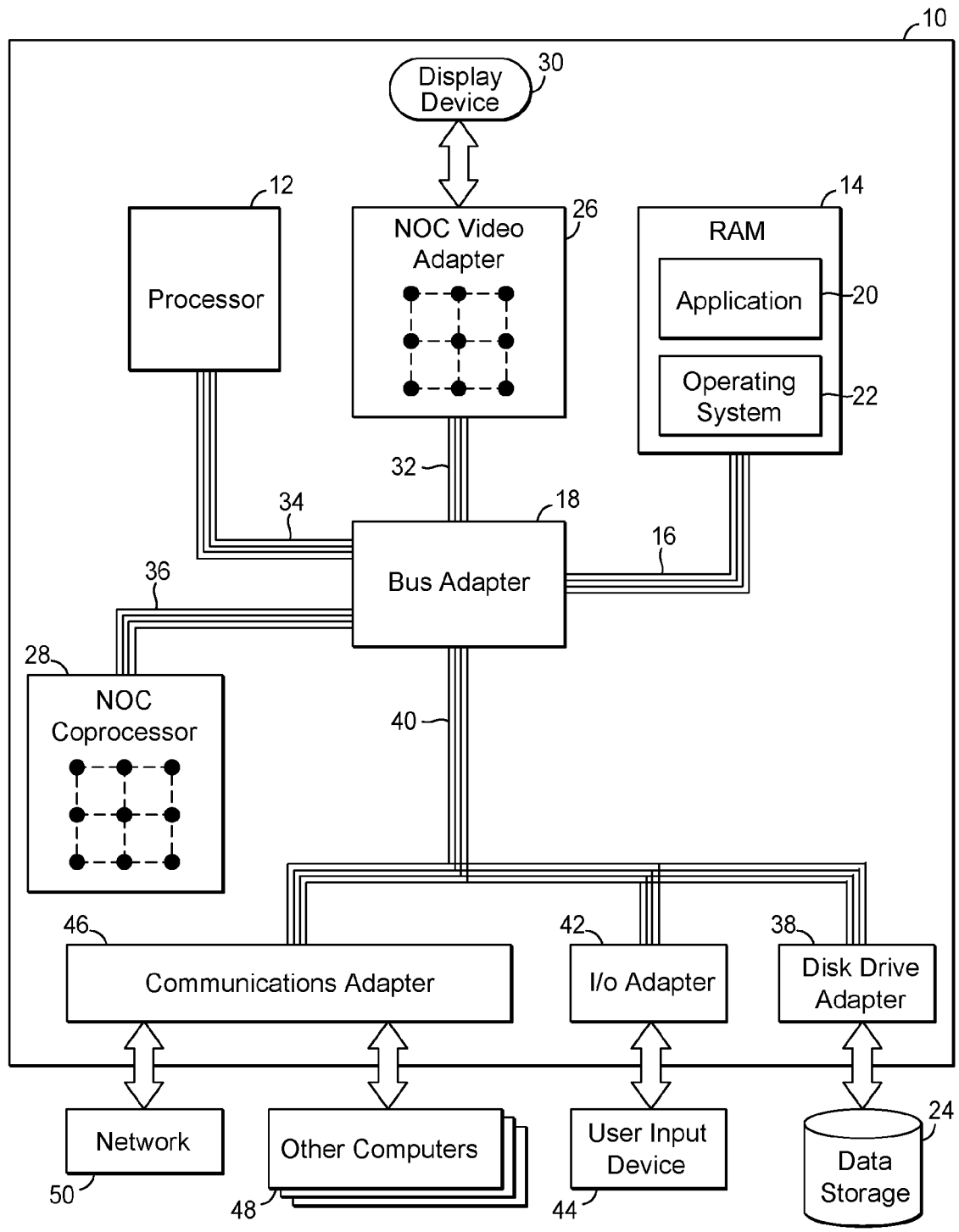
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
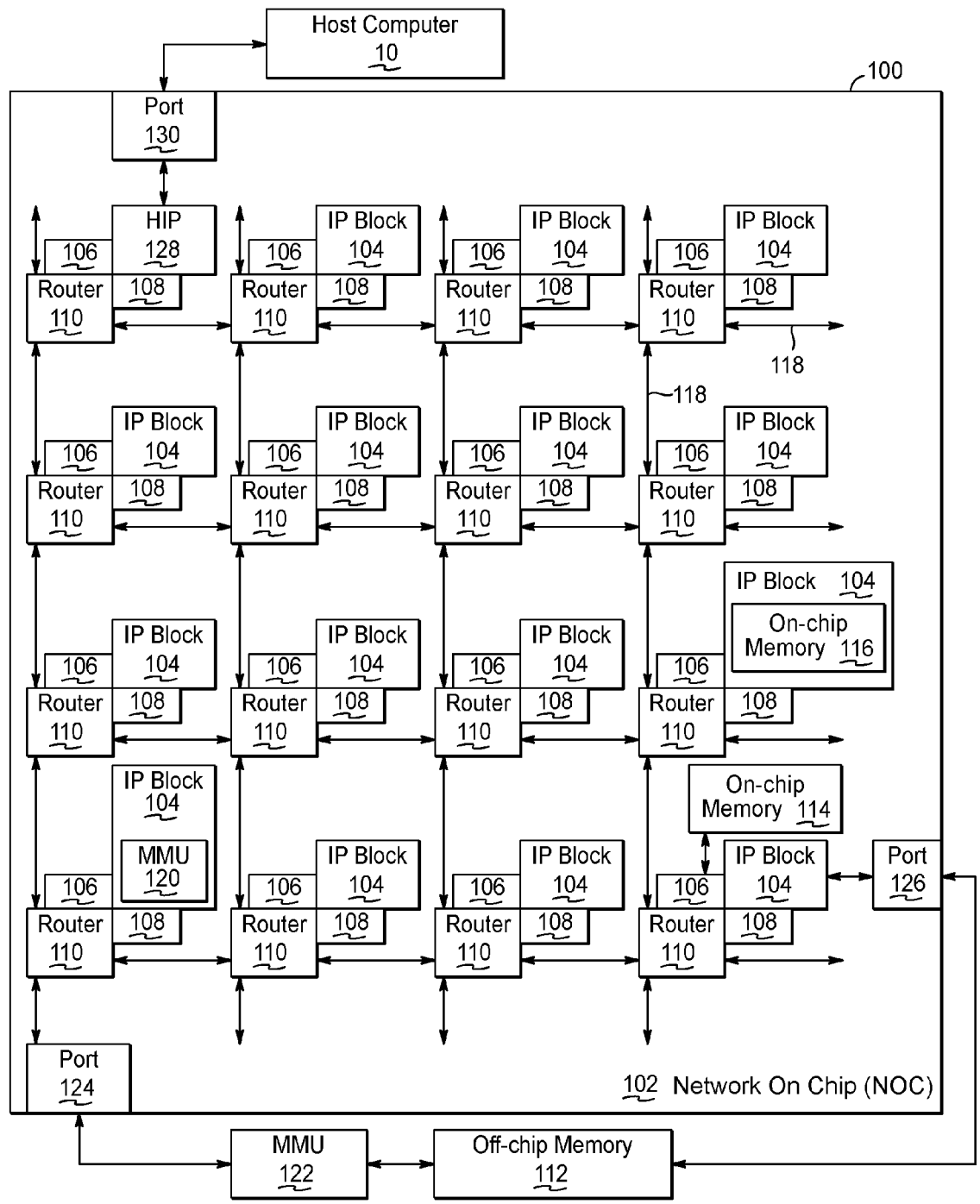
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
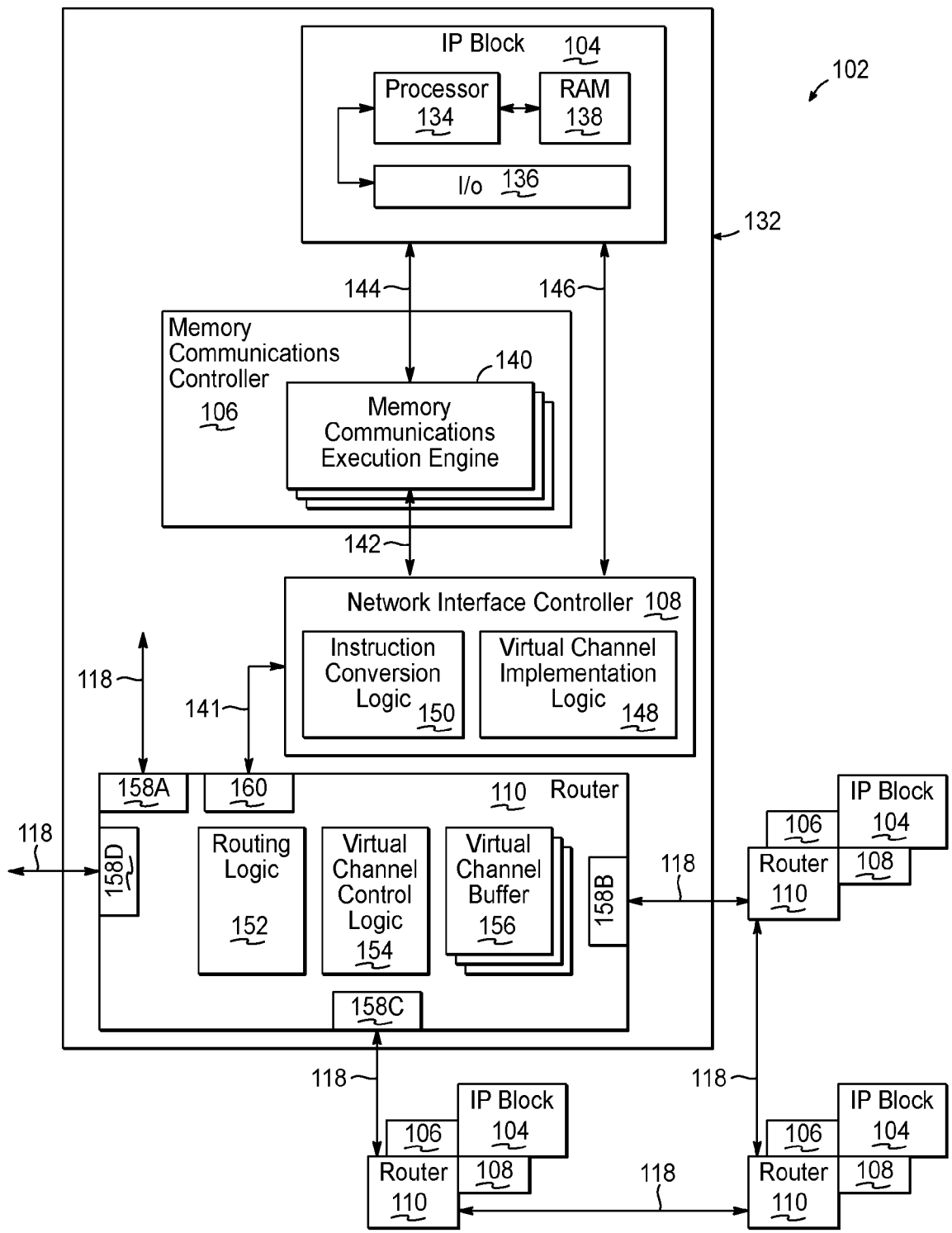
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
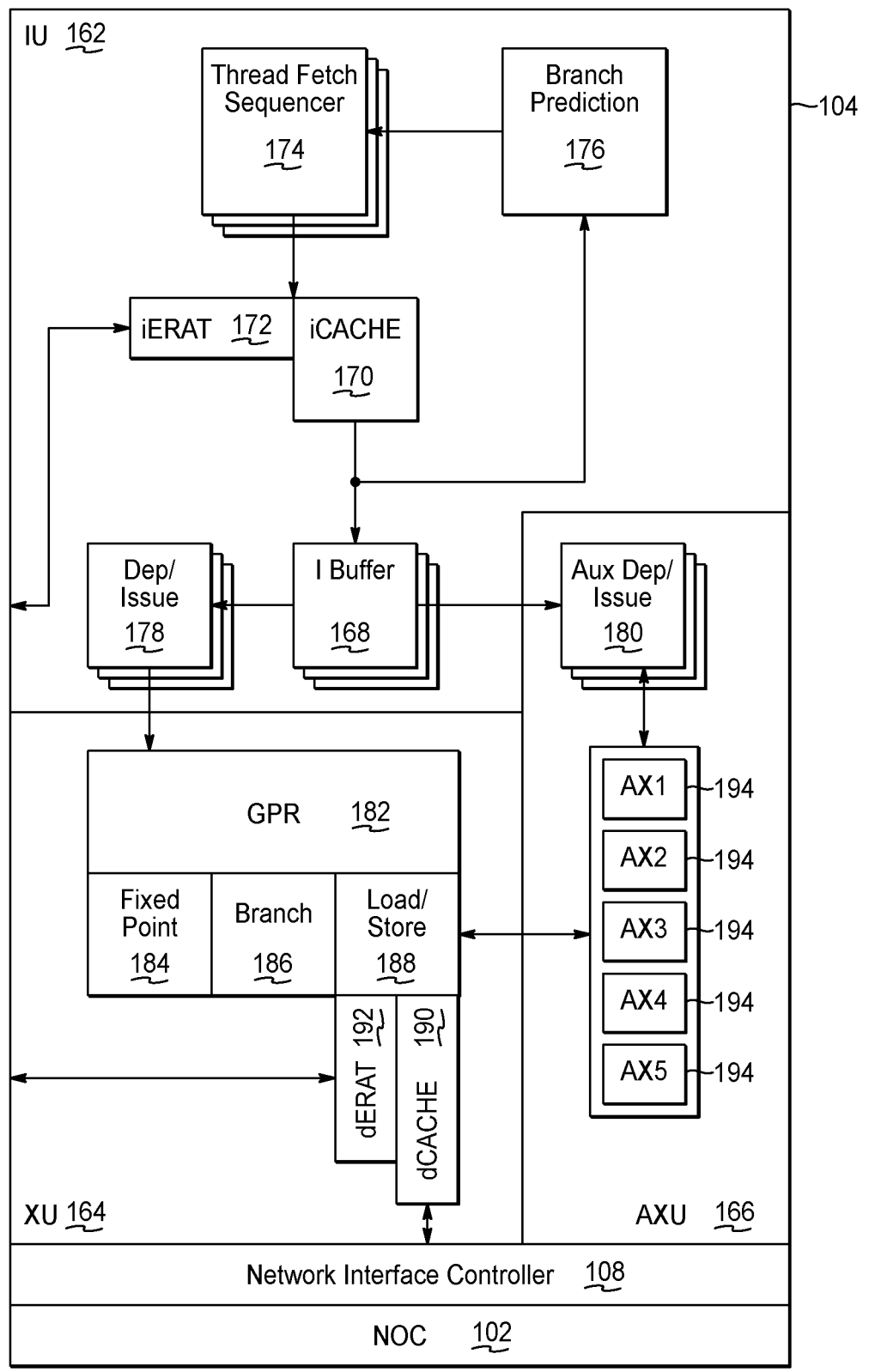
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit, including for example a vector execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32*b* or 64*b* PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Autovectorizing Architecture for Vector Execution

Legacy software written for previous iterations of hardware architectures may not be written to take advantage of certain advances in the instruction set architecture such as vector floating point math. Software may be rewritten or recompiled to take advantage of these hardware advances but doing so can be troublesome and expensive. In addition, such compilers may be imperfect and my not always yield the desired results easily, even if the hardware supports vector operations. As such, advances, such as embodiments of the present invention, which may accomplish an increase in performance without needing to recompile old software, may be extremely valuable. Advantageously, some embodiments of the invention facilitate processing/execution performance increases without the need to recompile software not supporting vector instruction architecture.

As will be discussed in greater detail below, pre-decode hardware logic within a processor or processing core may analyze a future stream of instructions and replace strings of scalar instructions with functionally equivalent vector instructions. The functionally equivalent vector instructions are then executed by a vector execution unit in lieu of the strings of scalar instructions, thereby effectively accelerating the execution of the scalar instructions by the vector execution unit. A functionally equivalent vector instruction, in this regard, may be considered to be any vector instruction that, for a given set of scalar instructions being substituted, generates the same result that would have otherwise been generated by the set of scalar instructions, so that from the standpoint of the software being executed by the processor, no functional change occurs in the software as a result of the substitution.

For example, in some embodiments of the invention pre-decode hardware logic analyzes a future stream of instructions and replace strings of independent scalar instructions followed by a dependent scalar add instruction with one heterogeneous vector dot product instruction supported by a vector execution architecture. In some embodiments, pre-decode hardware logic detects that a string of scalar instructions may be replaced with a vector instruction, and replaces the scalar instructions with the vector instruction in the instruction stream such that the vector instruction is issued to the vector execution unit in lieu of the scalar instructions.

Figure 5:
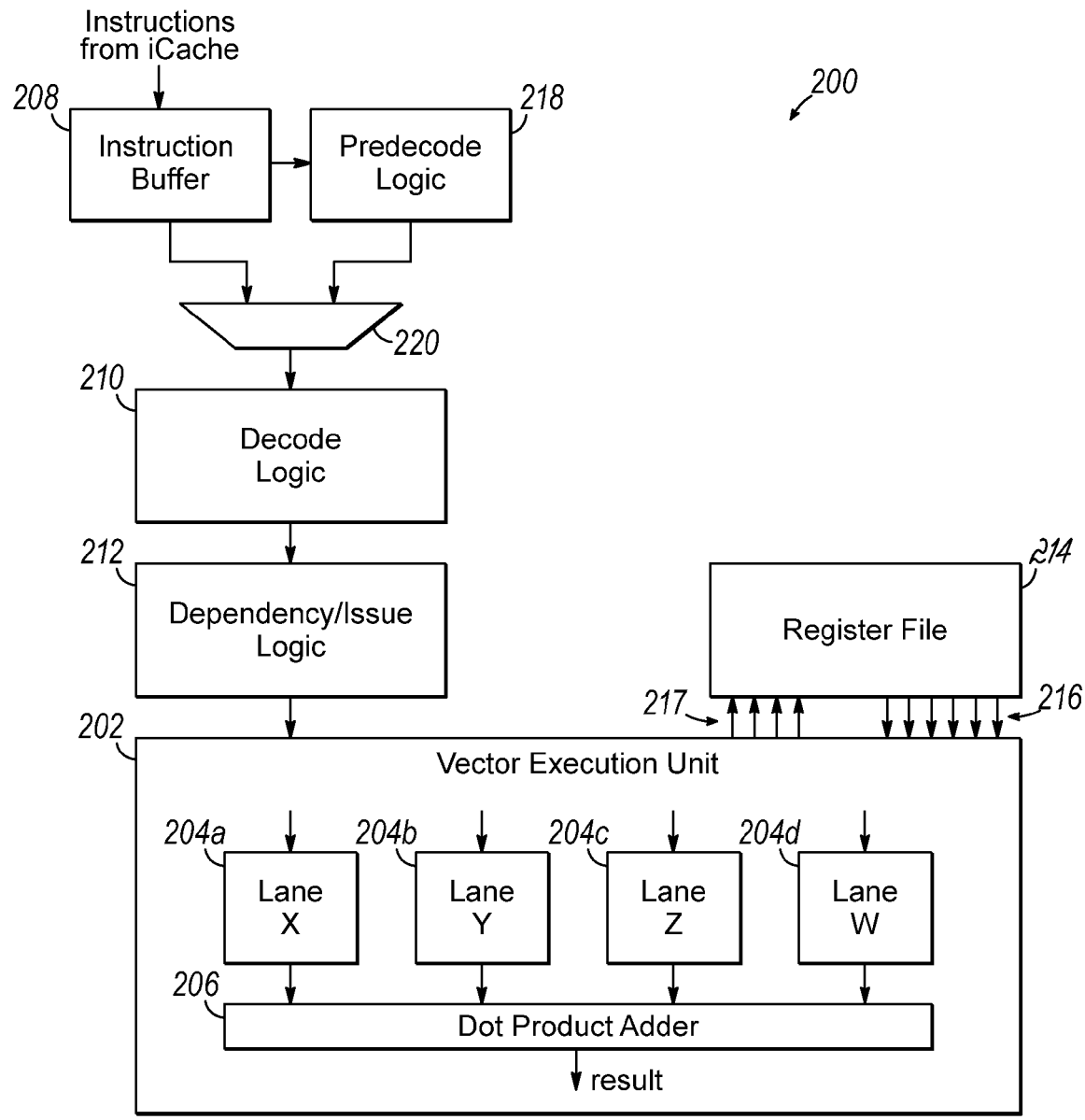
FIG. 5 is a block diagram of an exemplary processor incorporating a vector execution unit consistent with the invention, and capable of being implemented within an IP block from the NOC of FIG. 2.

Turning now to FIG. 5, this figure illustrates an exemplary processor or processing unit 200 including a vector execution unit 202. The vector execution unit 202 includes a plurality of processing lanes 204a-204d and a dot product adder 206, where one or more processing lanes 204a-204d may perform an operation of a vector instruction to generate a processing lane result, and the dot product adder 206 may sum the processing lane results to generate a vector instruction result.

It will be appreciated that conventional vector floating point execution units generally include a dot product adder that is utilized in connection with dot product floating point operations, and that generates a scalar result. It will also be appreciated that each processing lane typically includes various arithmetic logic components to perform various other arithmetic operations supported by the vector execution unit, and that for non-dot product operations, the processing lane results will typically be recombined to generate a vector result. The various arithmetic logic components that may be incorporated into the processing lanes, as well as the generation of vector results and other logic that may be implemented in a vector execution unit to fully support a vector instruction set architecture, have been omitted from FIG. 5 to facilitate a better understanding of the invention.

Consistent with some embodiments of the invention, instructions of an instruction stream may be input into processor 200 at instruction buffer 208 from a cache, including for example an iCache consistent with NOC architecture systems. The instruction buffer 208 streams the instructions of the instruction stream to decode logic 210 of processor 200, where each instruction of the instruction stream may be decoded, and the decoded instructions may be scheduled for execution by issue select logic 212. Issue select logic 212 typically includes logic for managing dependencies between instructions, and vector execution unit 202 processes instructions issued to the execution unit 202 by the issue unit 212. In addition, a register file 214 is coupled to the execution unit 202 via one or more read ports 216 such that data stored in the register file 214 may be read by the vector execution unit 202 from the register file 214, and the vector execution unit is coupled to the register file 214 via one or more write ports 217 such that data may be written to the register file 214 from the vector execution unit 202. As such, the execution unit may process data stored in the register file 214 based upon the instructions issued by issue logic 212, and the execution unit 202 may store data back to the register based upon the instructions issued by issue logic 212.

Vector execution unit 202 may be implemented, for example, as a floating point execution unit, or alternatively as a fixed point execution unit. In addition, vector execution unit 202 may be the only execution unit in processing unit 200, or in the alternative additional execution units, e.g., scalar execution units such as fixed point execution units, may also be provided in the processor. For example, in one embodiment, processor 200 is implemented as a processing core in an IP block as described above in connection with FIGS. 1-4, and vector execution unit 202 is implemented as an AXU. The invention, however, is not limited to such an implementation.

As shown in FIG. 5, processor 200 includes predecode logic 218 coupled to the instruction buffer 208. Predecode logic analyzes instructions stored in the instruction buffer 208, as instructions of an instruction stream pass through the instruction buffer 208 to the decode logic 210 to identify scalar instructions in the instruction stream that may be replaced by a functionally equivalent vector instruction. In response to identifying a plurality of scalar instructions that may be replaced by a vector instruction, the predecode logic 218 generates the functionally equivalent vector instruction and communicates the functionally equivalent instruction to the decode logic 210, such that the plurality of identified scalar instruction are replaced in the instruction stream by the functionally equivalent vector instruction prior to decoding the plurality of scalar instructions in the instruction stream.

In some embodiments, processor 200 may include substitution logic 220, e.g., incorporating a multiplexer, coupled to the instruction buffer 208, the predecode logic 218, and the decode logic 210. In these embodiments, the substitution logic 220 may receive functionally equivalent vector instruction from the predecode logic 218 and the plurality of scalar instructions in the instruction stream from the instruction buffer 208, and the substitution logic 220 may remove the scalar instructions from the instruction stream and insert the vector instruction into the location in the instruction stream where the scalar instructions were located in the instruction stream. As such, in parallel with communicating instructions in the instruction stream from the instruction buffer 208 to the decode logic 210, embodiments of the invention may substitute a functionally equivalent vector instruction for a plurality of scalar instructions in the instruction stream. Furthermore, predecode logic 218 may communicate data corresponding to the plurality of scalar instructions to be replaced with the vector instruction to the substitution logic 220 such that the substitution logic 220 may identify the plurality of scalar instructions to be substituted and the location at which the vector instruction is to be inserted.

Figure 6:
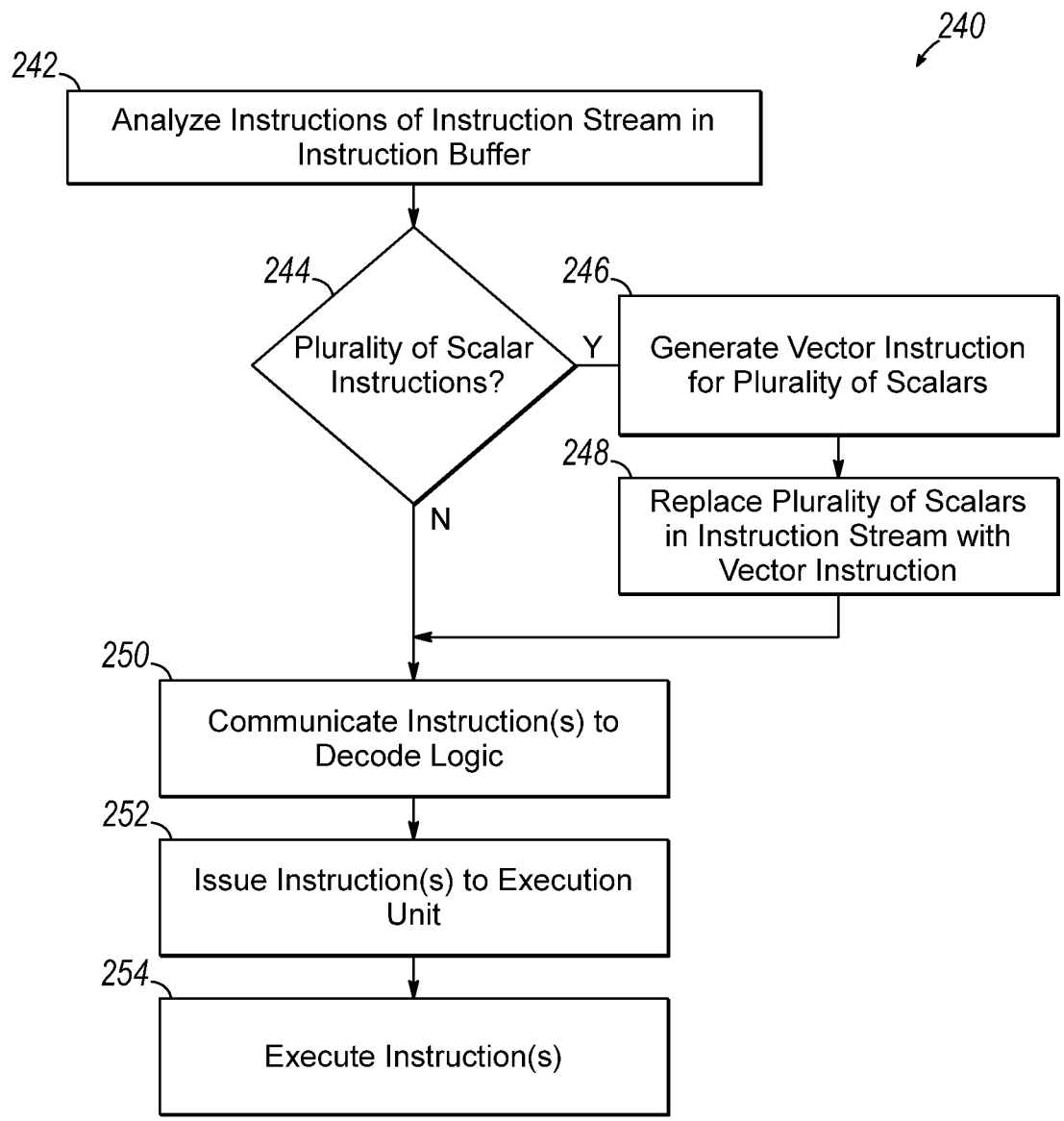
FIG. 6 is a flowchart illustrating a sequence of operations that may be performed by the processor of FIG. 5 to substitute scalar instructions in an instruction stream with a functionally equivalent vector instruction.

FIG. 6 provides a flowchart 240 illustrating a sequence of operations that may be performed by one or more processors of a NOC system, including for example the processor 200 of FIG. 5, to execute scalar instructions with a vector execution unit. Instructions of an instruction stream stored in an instruction buffer are analyzed utilizing a predecode logic coupled to the instruction buffer (block 242). The predecode logic identifies groups of scalar instructions that may be replaced by a functionally equivalent vector instruction in the instruction stream (block 244). While the predecode logic may analyze all instructions passing through the instruction buffer, all scalar instructions in an instruction stream may not be able to be substituted for a functionally equivalent vector instruction, and/or some instructions in the instruction stream may be vector instructions and would not require substitution in the instruction stream. As such, some instructions in the instruction stream will not be substituted for a functionally equivalent vector instruction. In some embodiments, the predecode logic may analyze instructions in the instruction buffer to identify a plurality of scalar instructions indicating independent operations that are summed at the end by a last, dependent scalar add instruction. As in some embodiments, a vector execution unit includes processing lanes that generate independent results which may then be summed using a dot product adder, a plurality of scalar instructions having a last scalar instruction that sums results from the other scalar instructions together may generally be considered a plurality of scalar instructions for which a functionally equivalent vector instruction may exist and/or be generated.

As such, in response to identifying a plurality of scalar instructions for which a functionally equivalent vector instruction exists and/or may be generated ("Y" branch of block 244), the predecode logic may generate a functionally equivalent vector instruction based on the plurality of scalar instructions, one or more characteristics of the vector execution unit, and/or one or more characteristics of a register file referenced in one or more of the scalar instructions (block 246). The plurality of scalar instructions are replaced by the functionally equivalent vector instruction in the instruction stream (block 248). The instructions are communicated to decode logic of the processor (block 250) for decoding, and the decoded instructions are issued to the execution unit (block 252) for execution (block 254).

A functionally equivalent vector instruction may generally comprise a vector instruction that may perform each operation indicated by the plurality of scalar instructions which the functionally equivalent vector instruction replaces. For example, if a plurality of scalar instructions includes a first scalar instruction indicating an add operation, a second scalar instruction indicating a subtraction operation, and a third scalar instruction indicating an add operation on the results of the first and second scalar instructions, a functionally equivalent vector instruction when executed may cause the vector execution unit to perform an add operation corresponding to the first scalar instruction on a first processing lane, a subtraction operation corresponding to the second instruction on a second processing lane, and the results from the first and second processing lanes may be added together corresponding to the third scalar instruction by causing the vector execution unit to perform an add operation using a dot product adder.

Moreover, generating a functionally equivalent vector instruction may be based at least in part on hardware characteristics associated with a vector execution unit. For example, a vector execution unit may comprise four processing lanes and a dot product adder, and in this exemplary embodiment the functionally equivalent vector instruction may cause the vector instruction to perform four operations concurrently on the processing lanes and a dot product add operation on the results, which may limit the number of scalar operations that may be replaced by one vector instruction. In addition, a register file referenced by one or more of the scalar instructions may comprise a limited number of read and/or write ports coupled to the vector execution unit. In this example, a functionally equivalent vector instruction may be based at least in part on the number of read and/or write ports. For example a vector execution unit may be coupled to a register file by six read ports, and in these embodiments, a functionally equivalent vector instruction may only be able to concurrently read six register addresses of the register file, and as such, the number of scalar instructions a functionally equivalent may be able to replace may be limited by the number of register addresses referenced by the plurality of scalar instructions.

Figure 7:
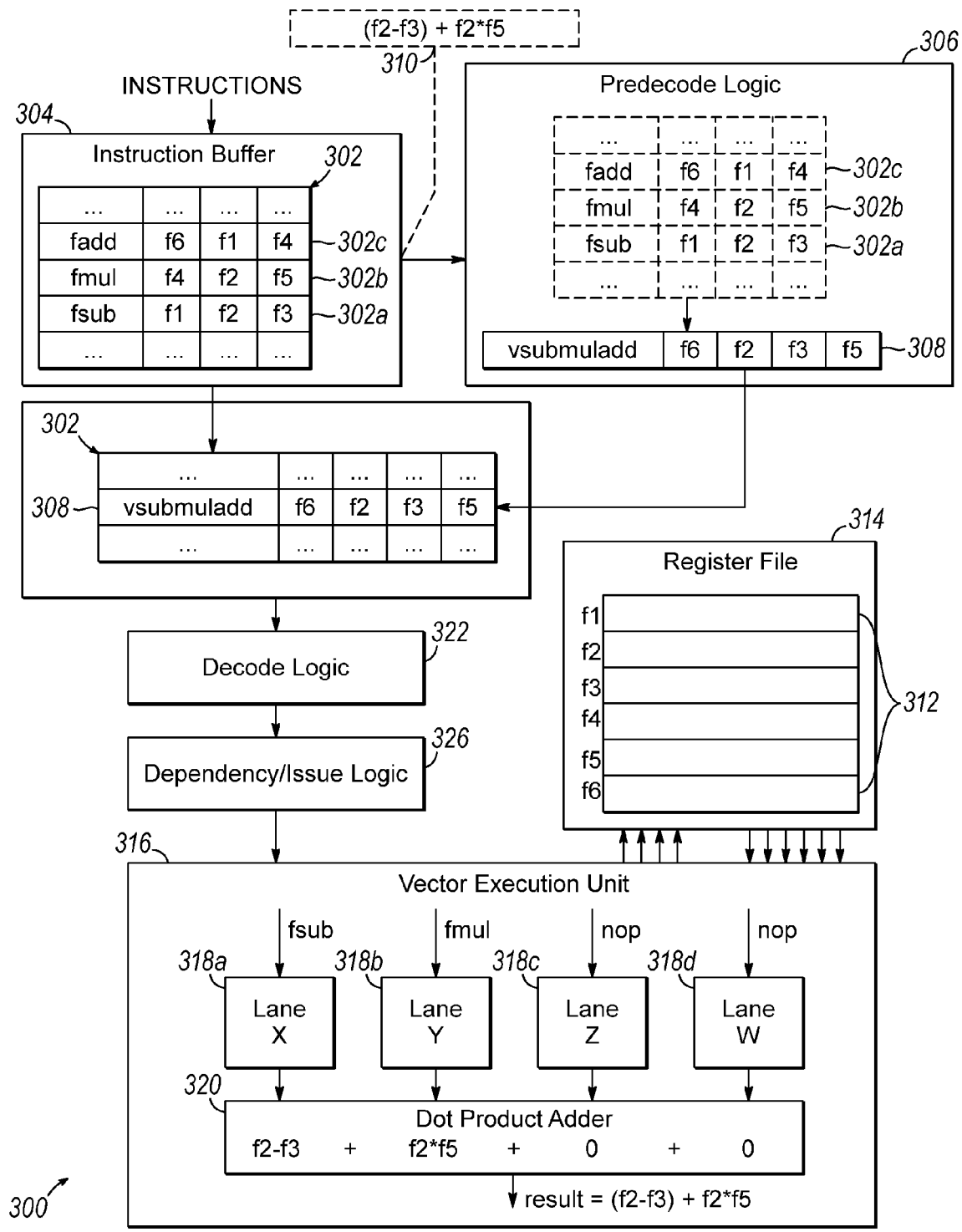
FIG. 7 is an exemplary block diagram of the processor of FIG. 5 substituting a functionally equivalent vector instruction into an instruction stream for execution by a vector execution unit of the processor.

Turning now to FIG. 7, this figure illustrates a processor 300 analyzing instructions 302 of an instruction stream stored in an instruction buffer 304 using predecode logic 306 to generate a functionally equivalent vector instruction 308 based on a plurality of instructions 302a-c stored in the instruction buffer 304. As shown, processor 300 receives instructions 302 in an instruction stream, where the instructions may be received from an iCache of a NOC architecture system consistent with embodiments of the invention. A plurality of scalar instructions 302a-c may be stored in the instruction buffer as part of the instruction stream. For clarity in the example, reference operation 310 illustrates the mathematical operation that the plurality of scalar instructions 302a perform when executed. As shown, the plurality of scalar instructions 302a-c perform: (f2−f3)+f2*f5, where f1−f6 as used in the example reference addresses 312 corresponding to a register file 314 coupled to a vector execution unit 316 of the processor 300. In this example, a first scalar instruction 302a of the plurality of scalar instructions 302 instructs an execution unit to subtract the floating point value stored at register address 'f3' from the floating point value stored at register address 'f2' and to store the result at register address 'f1' (i.e., f1=f2−f3); a second scalar instruction 302b of the plurality of scalar instructions 302 instructs an execution unit to multiply the floating point value stored at register address 'f2' and the floating point value stored at register address 312 'f5' and store the result at register address 'f4' (i.e., f4=f2*f5); and a third scalar instruction 302c instructs an execution unit to add the floating point value stored at register address 'f1' and the floating point value stored at register address 'f4' and to store the result at register address 'f6' (i.e., f6=f1+f4).

As described herein, the predecode logic 306 identifies the scalar instructions 302a-c as a plurality of scalar instructions for which a functionally equivalent vector instruction exists and/or may be generated. As such, the predecode logic 306 generates the functionally equivalent vector instruction 308 based on the plurality of scalar instructions 302a-c, where the functionally equivalent vector instruction 308 instructs the vector execution unit 316 to perform one or more operations utilizing one or more processing lanes 304a-304d and a dot product adder 320 to generate a vector instruction result which stores the same result at register address 'f6' as the plurality of scalar instructions 302a-c would have produced when executed. In other words, in this example, the functionally equivalent vector instruction 308a generates a vector instruction result equivalent to the result 310 of the plurality of scalar instructions 302a-c (i.e., f6=(f2−f3)+f2*f5).

In parallel with communicating the instructions 302 of the instruction stream to decode logic 322 of the processor 300, substitution logic 324 may substitute the vector instruction 308 for the plurality of scalar instructions 302a-c in the instructions 302 in the instruction stream. In some embodiments, substitution logic may receive data from the instruction buffer 304 and/or predecode logic identifying the plurality of scalar instructions 302a-c that are to be substituted in the instruction stream. The instructions 302 of the instruction stream including the substituted vector instruction 308 are decoded by decode logic 322 of the processor 300, and an issue select logic 326 communicates the decoded instructions to the vector execution unit 316 for execution.

As shown, a first processing lane 318a performs an operation corresponding to the first scalar instruction 302a and a second processing lane 318b performs an operation corresponding to the second scalar instruction 302b. As shown, a third and fourth processing lane 318c,d perform no-op operations as instructed by the vector instruction 308. The results of each processing lane 318a-d are summed using the dot product adder 320 of the vector execution unit 316 to generate the vector instruction result which as indicated by the vector instruction 308 may be stored in the register address 'f6.'

In this exemplary embodiment, a functionally equivalent vector instruction 308 is generated based on the plurality of scalar instructions 302a-c and the vector instruction 308 is substituted into the instruction stream for the plurality of scalar instructions 302a-c. If a 6 cycle floating point pipeline is assumed for the example performing the scalar instructions 302a-c would have a latency of about 12 or 18 cycles (depending on whether any of the scalar instructions are dependent on one another) as opposed to performing the vector instruction 308.

Furthermore, it should be noted that, by combining the scalar instructions into the vector instruction, some of the registers that would have otherwise been used to store temporary results (registers 'f1' and 'f4' in this example) are no longer used, thereby freeing register space for other operations.

While the invention has been illustrated by a description of the various embodiments and the examples, and while these embodiments have been described in considerable detail, it is not the intention of the applicants to restrict or in any other way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention.

In addition, while the invention has been described in connection with a functionally equivalent vector instruction that replaces a sequence of independent scalar instructions followed by an add instruction that sums the results of the sequence of independent instructions, it will be appreciated that an innumerable number of different scenarios may be envisioned in which a string of scalar instructions could be replaced by a functionally equivalent vector instruction, so the invention is not limited to this particular type of functionally equivalent vector instruction.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method for executing scalar instructions in a processor including a vector execution unit including a plurality of processing lanes, each processing lane configured to perform an operation of a vector instruction to generate a processing lane result, and a dot product adder configured to sum the processing lane results to generate a vector instruction result, the method comprising:
  analyzing instructions stored in an instruction buffer associated with the processor utilizing a predecode logic coupled to the instruction buffer to identify a plurality of scalar instructions in an instruction stream for which a functionally equivalent vector instruction exists, wherein the plurality of scalar instructions includes a subset of scalar instructions generating independent results and a scalar add instruction for performing an add operation of the independent results;
  generating the functionally equivalent vector instruction based on the plurality of scalar instructions, wherein the vector instruction is configured to perform an operation based on each scalar instruction of the subset of scalar instructions and an add operation based on the scalar add instruction;
  substituting the functionally equivalent vector instruction for the plurality of scalar instructions in the instruction stream; and
  executing the functionally equivalent vector instruction in the vector execution unit to generate a vector instruction result by:
    performing each operation of the vector instruction corresponding each scalar instruction of the subset of scalar instructions with a processing lane of the vector execution unit to generate a plurality of processing lane results, and
    performing the add operation of the vector instruction corresponding to the scalar add instruction with the dot product adder of the vector execution unit to generate the vector instruction result.

2. A method for executing instructions in a processor, the method comprising:

analyzing instructions stored in an instruction buffer associated with the processor to identify a plurality of scalar instructions in an instruction stream for which a functionally equivalent vector instruction exists; and substituting the functionally equivalent vector instruction for the plurality of scalar instructions in the instruction stream such that the functionally equivalent vector instruction is executed by a vector execution unit of the processor in lieu of the plurality of scalar instructions, wherein the plurality of scalar instructions includes a subset of scalar instructions that generate independent results and an add instruction that performs an add operation of the independent results, and wherein identifying the plurality of scalar instructions in the instruction stream is based at least in part on the add instruction that performs an add operation of the independent results of the subset of scalar instructions in the plurality of scalar instructions.

3. The method of claim 2, wherein analyzing instructions performed in the instruction buffer to identify a plurality of scalar instructions in the instruction stream is performed utilizing predecode logic coupled to the instruction buffer.

4. The method of claim 3, wherein substituting the functionally equivalent vector instruction for the plurality of scalar instructions in the instruction stream includes communicating the functionally equivalent vector instruction from the predecode logic to instruction decode logic associated with the processor in lieu of communicating the plurality of scalar instructions from the instruction buffer to the instruction decode logic.

5. The method of claim 2, further comprising:
generating the functionally equivalent vector instruction utilizing predecode logic coupled to the instruction buffer based at least in part on the plurality of scalar instructions.

6. The method of claim 5, wherein the plurality of scalar instructions store at least one temporary result in a predetermining register in a register file and the functionally equivalent vector avoids storing the temporary result in the predetermined register of the register file.

7. The method of claim 6, wherein the register file comprises a predefined amount of read ports, and wherein generating the functionally equivalent vector instruction is based at least in part on the predefined amount of read ports of the register file.

8. The method of claim 5, wherein the processor includes a predefined amount of processing lanes, and wherein generating the functionally equivalent vector instruction is based at least in part on the predefined amount of processing lanes of the processor.

9. The method of claim 5, wherein each scalar instruction of the plurality of instructions includes a scalar opcode corresponding to a scalar operation to be performed by a processor in executing such instruction, and wherein generating the functionally equivalent vector instruction is based at least in part on the opcodes of each scalar instruction of the plurality of scalar instructions.

10. The method of claim 9, wherein the processor includes a plurality of processing lanes, and wherein the functionally equivalent vector instruction instructs one or more of the processing lanes to perform operations based at least in part on one or more of the scalar opcodes of the plurality of scalar instructions.

11. A circuit arrangement, comprising:
a vector execution unit configured to execute instructions, the vector instruction unit including a plurality of processing lanes, each processing lane configured to perform an operation of a vector instruction to generate a processing lane result, and a dot product adder configured to sum the processing lane results to generate a vector instruction result;

an instruction buffer coupled to the vector execution unit and configured to store instructions in an instruction stream for execution by the vector execution unit; and predecode logic coupled to the instruction buffer and configured to analyze instructions stored in the instruction buffer to identify a plurality of scalar instructions in the instruction stream for which a functionally equivalent vector instruction exists, and substitute the functionally equivalent vector instruction for the plurality of scalar instructions in the instruction stream such that the functionally equivalent vector instruction is executed by the vector execution unit in lieu of the plurality of scalar instructions, wherein the plurality of scalar instructions includes a subset of scalar instructions that generate independent results and an add instruction that performs an add operation of the independent results, and wherein the predecode logic identifies the plurality of scalar instructions in the instruction stream based at least in part on the add instruction that performs an add operation of the independent results of the subset of scalar instructions in the plurality of scalar instructions.

12. The circuit arrangement of claim 11, further comprising:
decode logic coupled between the instruction buffer and the vector execution unit, the predecode logic being configured to substitute the functionally equivalent vector instruction for the plurality of scalar instructions in the instruction stream by communicating the functionally equivalent vector instruction to the decode logic.

13. The circuit arrangement of claim 11, wherein the predecode logic is further configured to generate the functionally equivalent vector instruction based at least in part on the plurality of scalar instructions.

14. The circuit arrangement of claim 13, further comprising:
a register file coupled to the vector execution unit;
wherein the plurality of scalar instructions includes a plurality of operand register addresses for the register file, and wherein the predecode logic is configured to generate the functionally equivalent vector instruction including the plurality of operand register addresses for the register file.

15. The circuit arrangement of claim 14, wherein the register file includes a predefined amount of read ports, and wherein the predecode logic is configured to generate the functionally equivalent vector instruction based at least in part on the predefined amount of read ports of the register file.

16. The circuit arrangement of claim 13, wherein the vector execution unit includes a predefined amount of processing lanes, and wherein the predecode logic is configured to generate the functionally equivalent vector instruction based at least in part on the predefined amount of processing lanes of the vector execution unit.

17. The circuit arrangement of claim 13, wherein each scalar instruction of the plurality of instructions includes a scalar opcode corresponding to a scalar operation to be performed by a processor in executing such instruction, and wherein the predecode logic is configured to generate the functionally equivalent instruction based at least in part on the opcode of each scalar instruction of the plurality of scalar instructions.

18. The circuit arrangement of claim 17, wherein the predecode logic is configured to generate the functionally equivalent vector instruction such that a processing lane of the vector execution unit performs an operation based at least in part on one or more of the scalar opcodes of the plurality of scalar instructions when executing the functionally equivalent vector instruction.

19. The circuit arrangement of claim 11, wherein the plurality of scalar instructions store at least one temporary result in a predetermined register in a register file and the predecode logic is configured to generate the functionally equivalent vector to avoid storing the temporary result in the predetermined register of the register file.

20. An integrated circuit device comprising the circuit arrangement of claim 11.

21. A program product comprising a computer readable medium and logic definition program code resident on the computer readable medium and defining the circuit arrangement of claim 11.

* * * * *